Aug. 8, 1939.                H. A. LEE                2,168,604
                         ELECTRIC BROILER
                         Filed Feb. 27, 1939
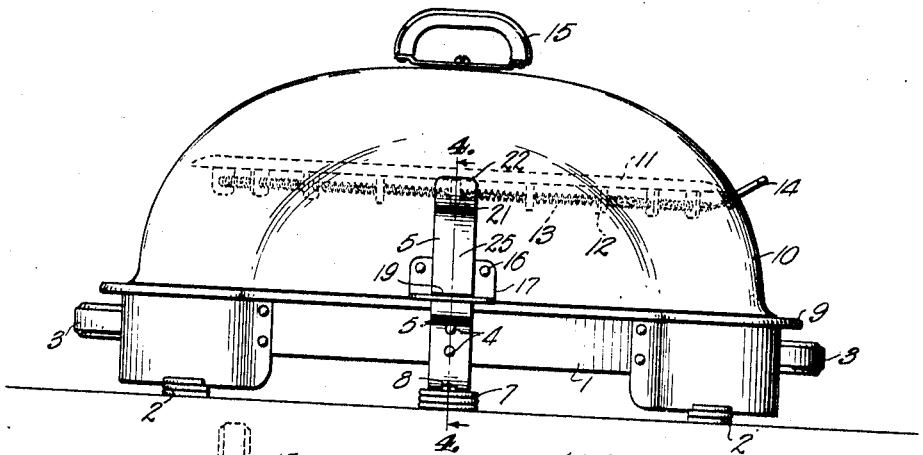
Fig. 1.
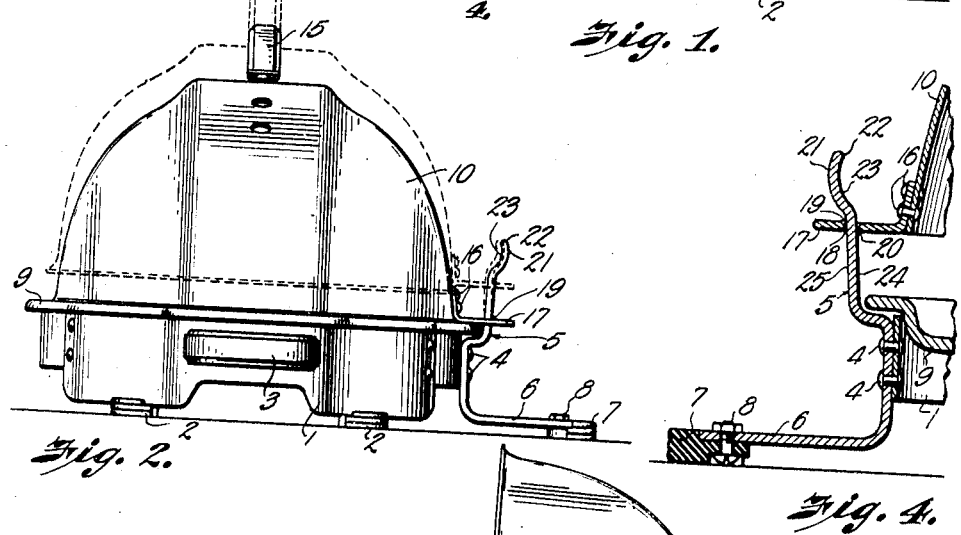
Fig. 2.          Fig. 4.
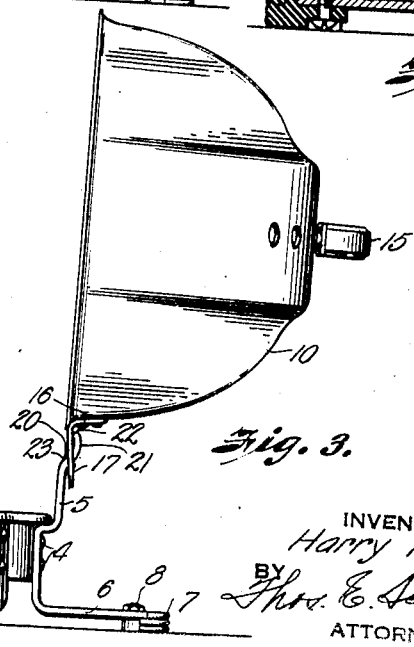
Fig. 3.
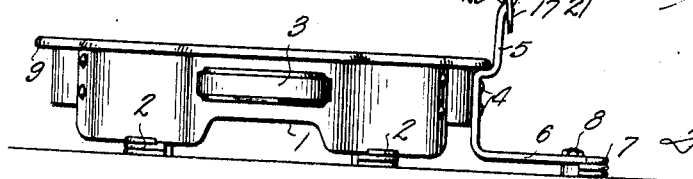
INVENTOR
Harry A. Lee
BY
Thos. E. Scofield
ATTORNEY Patented Aug. 8, 1939

2,168,604

UNITED STATES PATENT OFFICE 2,168,604

ELECTRIC BROILER

Harry A. Lee, Kansas City, Kans., assignor to Foster L. Talge, operating as Rival Manufacturing Company, Kansas City, Mo.

Application February 27, 1939, Serial No. 258,718

4 Claims. (Cl. 53—5)

My invention relates to electric broilers and more particularly to a broiler of the overhead type.

A broiler of the overhead type comprises a platter or the like, over which a heating arrangement, provided with a suitable reflector, is adapted to be positioned. The heating arrangement usually comprises a coil or coils of electric resistance wire, adapted to be heated to incandescence by the passage of an electric current.

In order to properly broil meat, fish or the like, it is essential that the comestible being broiled is in direct communication with the surrounding air. If the broiling cover were placed around the meat or fish being broiled, the vapors freed during the broiling process would tend to steam it.

One object of my invention is to provide an electric broiler of the overhead type including means for positioning the heating assembly at any desired point within predetermined limits from the meat or fish being broiled.

Another object of my invention is to provide simple and expeditious means for holding the broiling assembly in an open position during the insertion and removal of the meat or fish to or from the broiler.

Other and further objects of my invention will appear from the following description.

In the accompanying drawing which forms part of the instant specification and is to be read in conjunction therewith and in which like reference numerals are used to indicate like parts in the various views:

Figure 1 is a side elevation of an electric broiler assembly embodying one mode of carrying out my invention.

Figure 2 is an end elevation of the broiler assembly shown in Figure 1, illustrating the cover and associated heating elements in raised position.

Figure 3 is a view similar to Figure 2, showing the cover assembly in open position.

Figure 4 is an enlarged sectional fragmentary view of the hinge construction of my invention.

Referring now to the drawing, I provide a base member comprising essentially a frame 1 to which is secured in any suitable manner feet 2 made of material having a low coefficient of heat conductivity such as a phenol condensation product, wood, hard rubber, or various plastic materials. Handles 3 of similar material are provided. Secured to the base member 1 by means of rivets 4 is a standard 5 formed with an extension 6 to the end of which is secured a foot 7 by means of a bolt 8. The base member is adapted to support a metal platter 9 which may be of any suitable type and is adapted to receive the meat, fish or the like, which is to be broiled. The cover member 10 is provided with a polished metal reflector 11. To the reflector 11 is secured a plurality of porcelain or ceramic hangers 12 which support a coil of electric resistance wire 13, which forms the heating element. The heating coil 13 terminates in prongs 14 through which electric connection is made.

A handle 15 of low heat conductivity material is secured to the cover member 10 in any suitable manner. Secured to the cover member 10 by means of rivets 16 is a lug 17 provided with a slot 18, the length of which is slightly greater than the width of the standard 5.

Referring now to Figure 4, it will be seen that the walls of the slot 18 are upset to provide one edge 19 projecting upwardly and one edge 20 projecting downwardly. It will also be observed that the standard 5 extends at a slight angle to the vertical and terminates in a curved portion 21. The curved portion 21 and the lug 17 are adapted to interact to form a hinge permitting the cover member 10 to be moved to the position shown in Figure 3. In this position, the upper edge 22 of the standard 5 acts as a stop member limiting the movement of the cover assembly. The center of gravity of the cover member being to the right of the standard as viewed in Figure 3 will tend to rotate the cover member around a point on the inclined surface 23 of the curved portion 21. The extension 6 of the standard 5, together with the weight of the base member, will insure the stability of the assembly.

The cover member 10 may be moved to the position shown in Figure 1 by rotating the cover in a counterclockwise direction as viewed in Figure 3, until the walls of the slot 18 are parallel to the surfaces of the standard 5. In this position, the standard may be moved freely up and down. It will be understood, of course, that the cover may be easily removed by maintaining the walls of the slot 18 parallel to the walls of the curved portion 21, which will permit easy removal of the cover.

Referring now to Figure 4, I have shown a simple and expeditious means for positioning the cover and associated broiling assembly in any desired position on the standard 5, between fully closed position and fully open position, which position of course is determined by the height of the standard 5. It will be observed that, in the position shown in Figure 4, the edge 20 of the slot contacts the surface 24 of the standard and acts as a fulcrum around which the cover rotates. The rotational movement of the cover is limited by contact of the edge 19 with the surface 25 of the standard 5. The weight of the cover member and associated parts is sufficient to clamp the lug 17 to the standard 5 in any set position. All that is necessary is to rotate the cover until the walls of the slot 18 are parallel to the sides of the standard 5 and move the cover to the desired position. When the cover reaches the desired position, it is permitted to rotate in a clockwise direction as viewed in Figure 4, until the edges 19 and 20 clamp against the sides 25 and 24 of the standard. The cover will then remain in the position set. With the cover member spaced from the platter 9, the meat or other food being broiled will have access to the air and will be subjected to radiant heat from the heating element of the broiling assembly.

After the broiling process has been completed, the cover may be lowered completely to maintain the food in warm condition. The platter itself will become heated by radiant heat and it may be used for serving the freshly broiled meat or the like.

It will be seen that I have accomplished the objects of my invention. I have provided a broiler of the overhead type in which the cover may be adjusted to any desired position in a simple and convenient manner. The cover may be swung to open position and supported by my construction. It is not necessary to tighten or loosen any adjusting nuts or the like, or to provide any pivoted hinge construction.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In a broiler, a base member having a standard, a cover member having a lug, said cover member being provided with heating means adapted to broil food supported on said base member, said lug being formed with a slot adapted to permit the passage of the standard therethrough, said slot being wider than the thickness of said standard, said lug projecting from said cover member to one side thereof, whereby the weight of said cover member will rotate said slot around said standard to clamp the same between opposite upper and lower edges of the slot.

2. A broiler as in claim 1 in which said slot is formed with an upwardly extending edge and an oppositely disposed downwardly extending edge, said edges being adapted to engage said standard.

3. A broiler as in claim 1 in which said standard is formed with a curved portion adjacent its upper end, said curved portion being formed to permit said cover to swing to a position substantially normal to the plane of the base member.

4. A broiler as in claim 1 in which said standard is formed with an outwardly projecting leg.

HARRY A. LEE.